Nov. 9, 1965
L. S. SUOZZO
3,217,118
POSITION SENSING APPARATUS
Filed Nov. 6, 1961
3 Sheets-Sheet 1
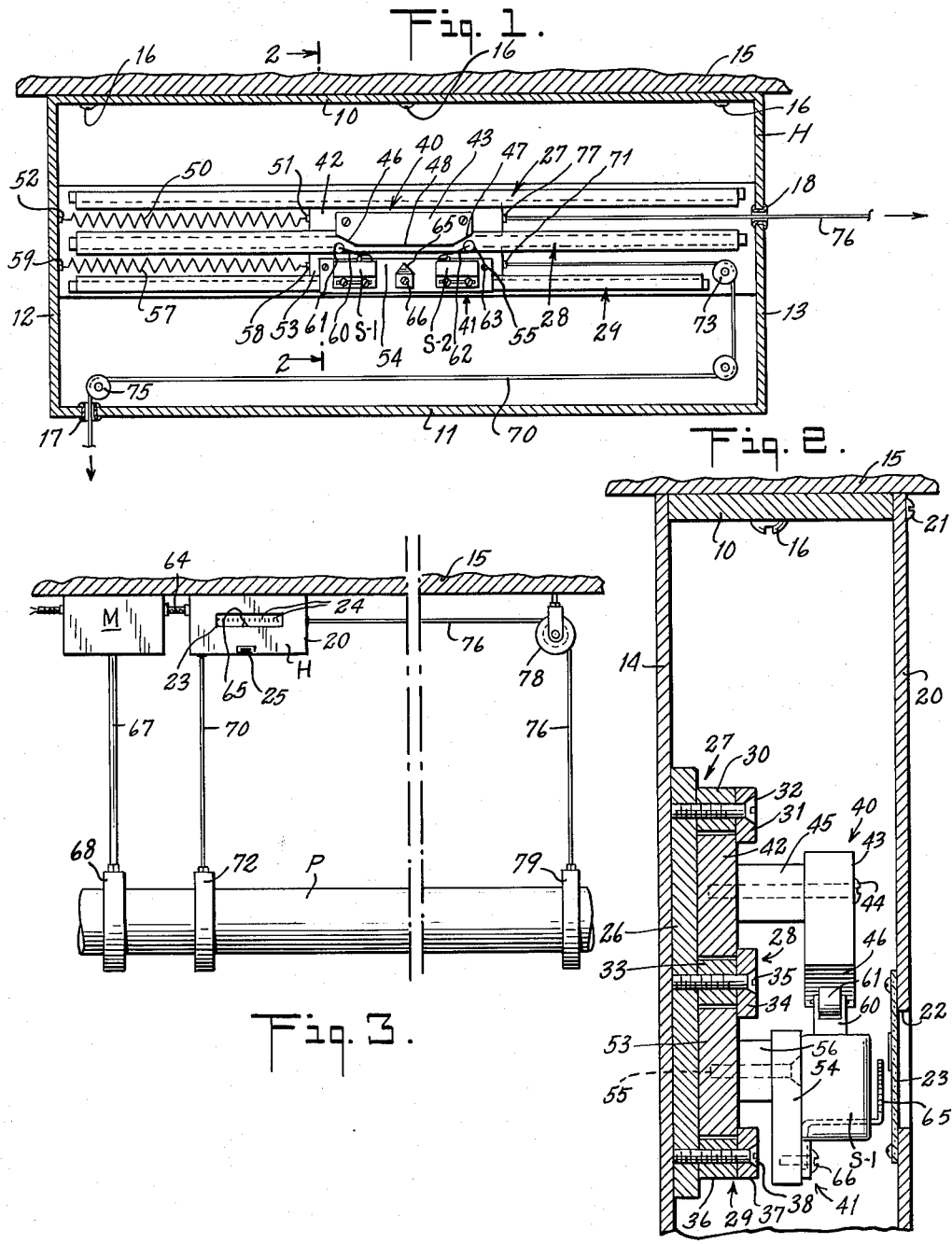
INVENTOR.
LEONARD S. SUOZZO
BY
ATTORNEY

INVENTOR.
LEONARD S. SUOZZO

United States Patent Office 3,217,118
Patented Nov. 9, 1965

3,217,118
POSITION SENSING APPARATUS
Leonard S. Suozzo, Hackensack, N.J.
(50 Church St., New York, N.Y.)
Filed Nov. 6, 1961, Ser. No. 150,258
8 Claims. (Cl. 200—52)

This invention relates to sensing apparatus in general and pertains, more particularly, to position sensing apparatus that is adapted for use with a load, such as piping, at least a portion of which is subjected to angular movement while in active use.

The position sensing apparatus of this invention has a number of uses. It is especially useful with piping loads and as an adjunct to support means for such loads. Accordingly and for the purposes of this application, the ensuing discussion and description and the accompanying drawings are directed to sensing apparatus of this invention as applied to piping loads.

Piping systems are utilized extensively in power plants and in various other types of installations to transmit steam or other high temperature fluids from one location to another. Changes in temperature of the fluid transmitted through the piping cause the piping to expand or contract depending on whether the fluid temperature is increased or decreased. It is important that the weight of the piping and its fluid contents be properly supported to prevent creation of undue and possibly dangerous stresses in the piping, as a consequence of expansion or contraction of the piping material. The proper support of the weight of such piping has been a matter of serious concern to industry for many years.

There have been a number of important advances in the art of support devices for piping and the like in recent years. Such advances are exemplified by my following patents: No. 2,903,213, granted September 8, 1959, for "Constant Support Device" and No. 2,939,663, granted June 7, 1960, for "Constant Support Device." The devices of these patents utilize spring forces to control vertical movement of a load.

Vertical movement of piping and similar loads may also be controlled by an electro-mechanical device which is devoid of springs, as disclosed in my pending patent applications Serial No. 45,394, entitled "Motor-Actuated Suspension Type Constant Support Device," now Patent No. 3,033,506.

It has been ascertained that at least portions of piping loads, in many installations, are subjected to movements which result in angular deviations from a normal reference plane. It is important in instances of this type that such deviations be maintained within safe limits to prevent creation of undesirable stresses in the piping. There is no known apparatus, except that disclosed in my pending application Serial No. 109,886, now Patent No. 3,161,739 for properly sensing these deviations and then placing a support device into active service whereby to compensate for the deviations. The apparatus of the present invention not only performs all of the functions of the apparatus disclosed in Patent No. 3,161,739 but also affords a number of additional advantages. For one thing, it permits the use of a more compact arrangement of control devices. Moreover, certain forms of apparatus according to this invention have their parts so constructed and arranged as to allow for extensive movement of a piping load.

It is the primary object of this invention to provide improved sensing apparatus which is responsive to predetermined variations in the angular position of a load, such as piping.

Another object of the invention is to provide position sensing apparatus for piping or the like, the sensing apparatus being adapted to cooperate with a support device for the piping whereby to place the support device into or out of active service, as required and in a manner to compensate for predetermined angular movement of the piping.

The invention has for a further object the provision of position sensing apparatus having its parts so constructed and arranged as to allow for extensive movement of a load and including a compact arrangement of control devices.

A still further object of the invention is to provide a sensing device of the character indicated that is simple and compact in design; that is sturdy and durable in construction; that is reasonable in manufacturing, installation and maintenance costs; and that is adapted to perform its intended functions in a dependable and trouble-free manner.

The enumerated objects and additional objects, together with the advantages of this invention, will be readily understood by persons skilled in the art from the following detailed description taken in conjunction with the accompanying drawings which respectively describe and illustrate three forms of construction embodying the invention.

In the drawings, wherein like reference characters denote corresponding parts throughout the several views:

FIG. 1 is a view in vertical cross-section of one recommended form of position sensing apparatus according to the invention;

FIG. 2 is a view taken along line 2—2 of FIG. 1;

FIG. 3 is an elevational view on a reduced scale illustrating the position sensing apparatus shown in FIG. 1 operatively associated with a horizontal section of piping load and with a support device;

Figure 4:
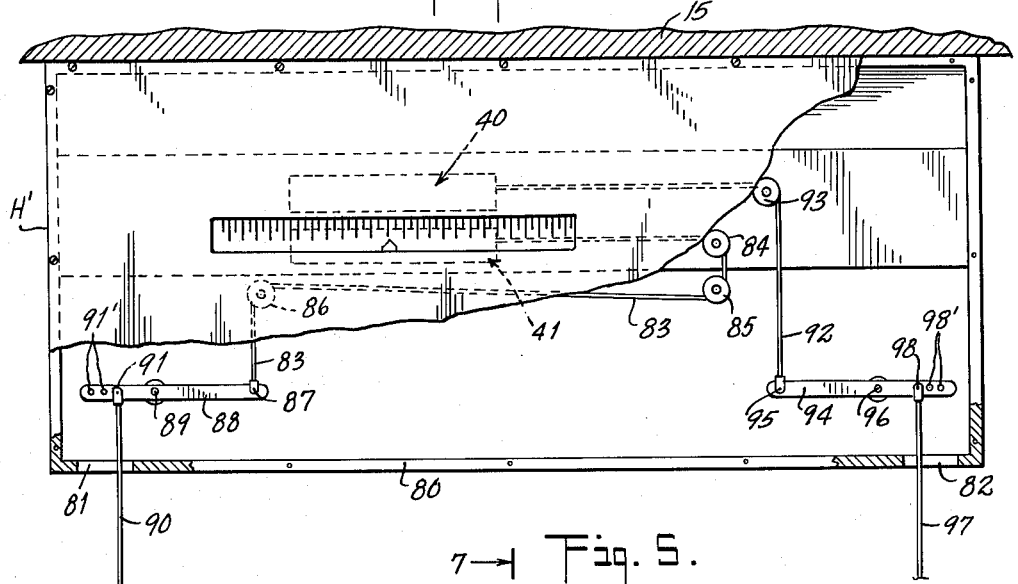
FIG. 4 is a view in front elevation of a second recommended form of position sensing apparatus according to the invention, certain parts being broken away for better illustration of other parts.

Reference is first had to FIGS. 1 and 2 wherein there is illustrated a housing H which includes a top wall 10, a bottom wall 11, side walls 12 and 13 and a rear wall 14. The foregoing walls are joined together, preferably by welding, to obtain a rigid frame structure which is secured to an overhead support 15, such as a building beam, by screws 16 or in any other desired manner known to the art. Bottom wall 11 is equipped with a grommet 17 and side wall 13 is equipped with a like grommet 18, as shown in FIG. 1.

The housing also includes a removable front wall or cover plate 20 that is held in place by screws 21 (FIG. 2). The cover plate is formed with an elongated slot 22 which is covered by a transparent window 23 to permit visual inspection of parts within the housing. Window 23 carries a scale having graduations 24. A bubble type level is mounted on the lower part of the front wall (FIG. 3).

A plate 26 is positioned within the housing and is secured to its rear wall 14. This plate carries a plurality of spaced parallel guide units 27, 28 and 29. Guide unit 27 consists of a rectilinear bar 30, a plate 31 bearing against and projecting below bar 30, and attaching screws 32. Guide unit 28 consists of a rectilinear bar 33, a plate 34 bearing against and projecting above and below bar 33, and attaching screws 35. Guide unit 29 is similar to guide unit 27 and consists of rectilinear bar 36, a plate 37 bearing against bar 36, and attaching screws 38. The several bars 30, 33 and 36 and plates 31, 34 and 37 are parallel.

Mounted on the guide units is a pair of units 40 and 41. Unit 40 comprises a slide member or block 42 which is positioned in the opening between bars 30 and 33 and is slidable along the rectilinear path defined by these bars. An actuator member 43 for operating electric switches, to be described, is secured to slide block 42 by screws 44. Interposed between the actuator member and the slide block is a spacer element 45. The actuator member is in the nature of a cam having inclined lower end surfaces 46 and 47 and a rectilinear central lower surface 48 which is parallel to the path of travel of the slide block. A stabilizing spring 50, which is stressed in tension, is anchored at its ends to slide block 42 and to housing end wall 12, as indicated at 51 and 52, respectively. Spring 50 normally and yieldingly urges unit 40 toward the left, as viewed in FIG. 1, along the path defined by its guide units.

Unit 41 comprises a slide member or block 53 which is positioned in the opening between bars 33 and 36 and is slidable along the path defined by these bars. A switch support member 54 is affixed to slide block 53 by screws 55 and is spaced from this slide block 53 by a spacer element 56. A second stabilizing spring 57 is anchored at one end to slide block 53, as indicated at 58, and at its other end to housing side wall 12, as indicated at 59. As in the case of spring 50, spring 57 normally and yieldingly urges unit 41 toward the left, as viewed in FIG. 1.

Attached to and movable with support member 54 is a pair of electric switches S-1 and S-2. These switches are normally open. Switch S-1 includes a movable contact arm 60 which is provided with a roller 61. Switch S-2 includes a like movable contact arm 62 and a roller 63. Rollers 61 and 63 are arranged for engagement with the lower surfaces of actuator member 43, depending on the relative position of units 40 and 41. An indicator pointer 65 is secured to switch support member 54 by a screw 66. The indicator pointer is positioned between the switches and cooperates with graduations 24 to indicate the position of unit 41.

Switches S-1 and S-2 are connected to a motorized support unit M by electric leads (not shown) which are contained in an electric cable 64 (FIG. 3). Unit M comprises a reversible electric motor, gearing and a screw jack and may be the same as or similar to the support device which is disclosed in my said Patent No. 3,033,506, to which reference may be had for details of construction and operation. Unit M is preferably suspended from support 15 and is connected to a load, in the form of a piping section P, by a rigid rod 67 and a strap 68. It is deemed sufficient for the purpose of this application to point out that, when one of the electric switches is closed, unit M is placed in active service and operates to impart upward movement to raise the portion of piping section P to which it is attached, and, when the other electric switch is closed, unit M operates in reverse to lower said portion of the piping section.

Unit 41 is coupled to the piping section by a flexible wire line, cable or the like 70 which is connected at one end to this unit, as indicated at 71 (FIG. 1), and at its other end to a strap 72, which is carried by the piping section (FIG. 3). Cable 70 rides over a first pulley 73, under a second pulley 74 and over a third pulley 75, all of which are positioned within the housing and are supported for rotation about corresponding parallel axes. The cable extends from pulley 75 through the opening defined by grommet 17 and thence to strap 72.

Unit 40 is similarly coupled to piping section P by a wire line, cable or the like 76 which is connected at one end to this unit, as indicated at 77 (FIG. 1), extends through the opening defined by grommet 18, rides over a pulley 78, which is suspended from support 15 at a location remote from the housing, as shown in FIG. 3, and is connected at its other end to a strap 79, which is carried by the piping section.

For the purpose of outlining the operation of the form of the invention shown in FIGS. 1, 2, and 3, it is assumed that the position sensing apparatus shown in these views is assembled and operatively connected to piping section P and to motorized unit M. At the time of installation, wire lines 70 and 76 are adjusted in length until the parts are in the relative position shown in FIG. 1. With the parts in this position, switch rollers 61 and 63 are out of engagement with actuator member 43, both switches are in their normally open position and motorized unit M is out of active service. The sensing apparatus is so constructed and arranged as to respond to predetermined variations in the angular position of the piping section.

It is assumed, by way of example, that piping section P tilts downwardly or toward the right, as viewed in FIG. 3. Such movement of the piping section causes corresponding sliding movement of units 40 and 41 toward the right, as viewed in FIG. 1, through the medium of wire lines of 70 and 76, respectively. Inasmuch as strap 72 is located quite close to strap 68 and strap 79 is located a substantial distance from strap 68, unit 40 will be moved a greater distance toward the right than unit 41 in response to the indicated tilting movement of the piping section. In other words, units 40 and 41 are subjected to differential sliding movement in response to tilting movement of the piping section. Upon predetermined differential sliding movement of these units, roller 63 of switch S-2 is successively engaged by inclined end surface 47 and horizontal central surface 48 of actuator member 43. This causes roller 63 and its movable contact arm 62 to move downwardly (FIG. 1), thereby closing switch S-2 and placing motorized unit M into active service. Unit M operates to lower the left end portion of the piping section and return it to normal position. At the same time, the parts within housing H will have returned to normal position by the action of springs 50 and 57 and switch S-2 will again be in its open position, thereby placing unit M out of active service.

Predetermined tilting movement of piping section P in a reverse direction, as viewed in FIG. 3, effects engagement of actuator member 43 with roller 61 and closes switch S-1. This again places unit M in active but reverse service, thereby raising the left end portion of the piping section, as viewed in FIG. 3, to return the same to normal position. At the same time, the parts within housing H will have returned to normal position (FIG. 1) so that switch S-1 is reopened and unit M is placed out of active service.

FIG. 4 illustrates a form of the invention which is closely related to that shown in FIGS. 1, 2 and 3. In FIG. 4, in a housing H' is similar to earlier-described housing H and includes a bottom wall 80 having a pair of slots 81 and 82. The construction illustrated in FIG. 4 differs over that illustrated in FIGS. 1, 2 and 3 principally in that it utilizes modified forms of coupling means for connecting units 40 and 41 to the piping section. The coupling means for connecting unit 41 to the piping section includes a wire line, cable or the like 83 which corresponds to wire line 70 and which engages pulleys 84, 85 and 86. Wire line 83 is connected at 87 to a lever 88 which is pivotal about a stub shaft 89. A second wire line 90 is connected at one end to lever 88, as indicated at 91, and is adapted to be connected at its other end to strap 72. Lever 88 is provided with a series of openings 91' to permit adjustable connection of the upper end of wire line 90 to that lever.

It will be observed that pivot connection 89 is intermediate the connections of wire line 83 and the lever and of wire line 90 and the lever. It will also be noted that the distance between connection 87 and pivot 89 is substantially greater than that between pivot 89 and connection 91 or any of the openings 91'. Wire line 90, lever 88 and wire line 83 are so constructed and arranged that slight angular movement of the piping section will result in corresponding but magnified sliding movement of unit 41.

The coupling means for unit 40 also comprises a wire line, cable or the like 92 which is connected at one end to unit 40, engages a pulley 93 and is connected at its other end to a lever 94, as indicated at 95. Lever 94 is pivoted to stub shaft 96. A second wire line 97 is connected to the side of lever 94, which is remote from connection 95, as indicated at 98. Wire line 97 extends through slot 82 and is adapted to be connected to strap 79. Lever 94 is provided with a series of openings 98 which corresponds to openings 91' of lever 88. Here again, wire line 97, lever 94 and wire line 92 are so constructed and arranged that an increment of angular movement of the piping section will result in a corresponding but greater increment of sliding movement of the unit.

The operation of a form of the invention shown in FIG. 4 is similar to that shown in FIGS. 1, 2 and 3.

Figure 5:
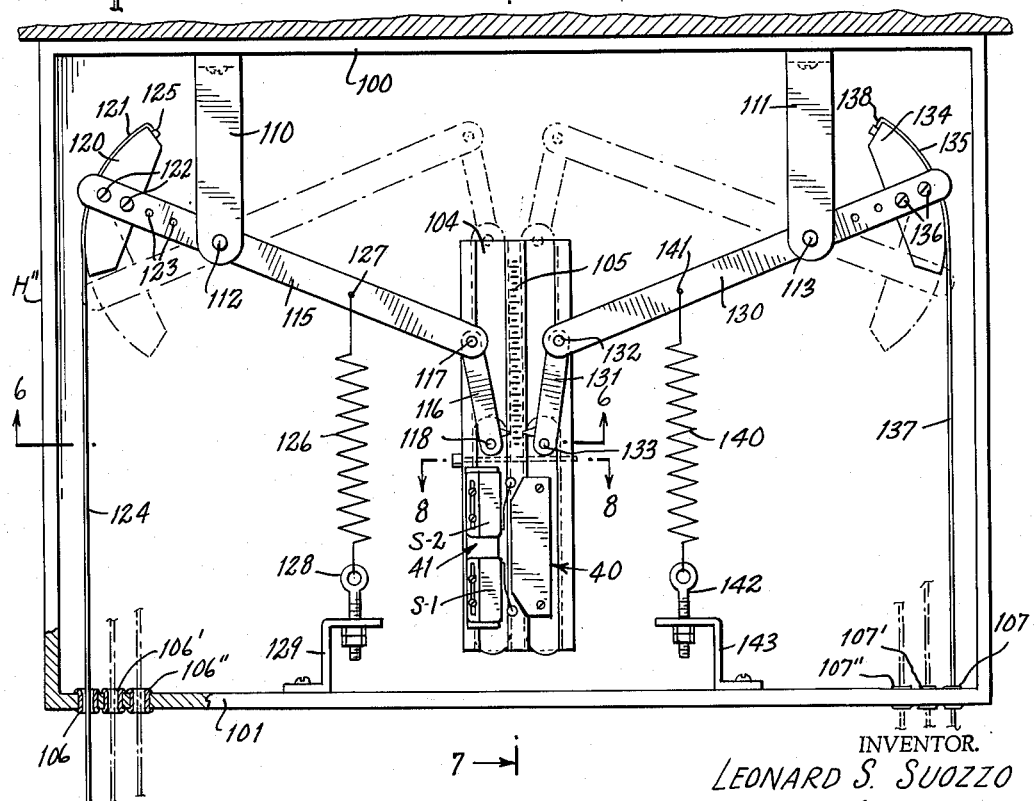
FIG. 5 is a view of a third recommended form of position sensing apparatus according to the invention with the front cover plate removed, certain parts being shown in cross-section.
Figure 7:
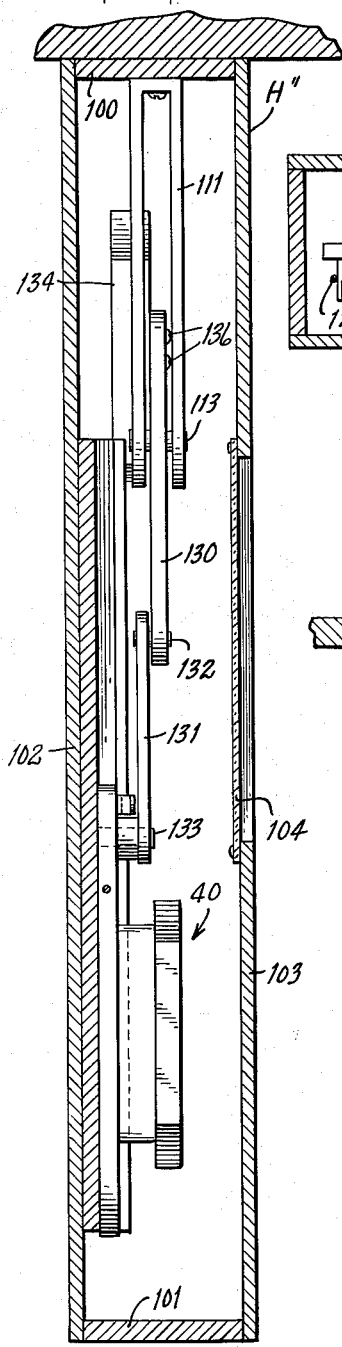
FIG. 7 is an enlarged view taken along line 7—7 of FIG. 5.
Figure 6:
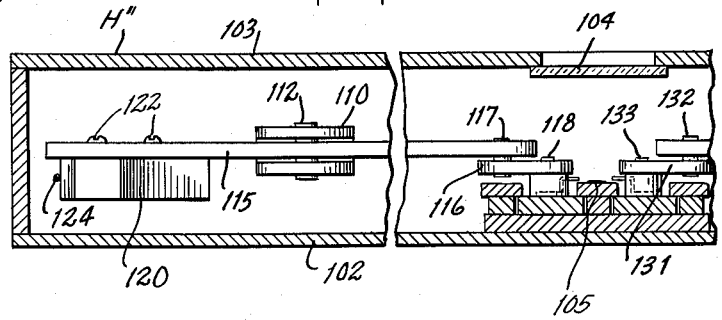
FIG. 6 is an enlarged fragmentary view taken along line 6—6 of FIG. 5.
Figure 8:
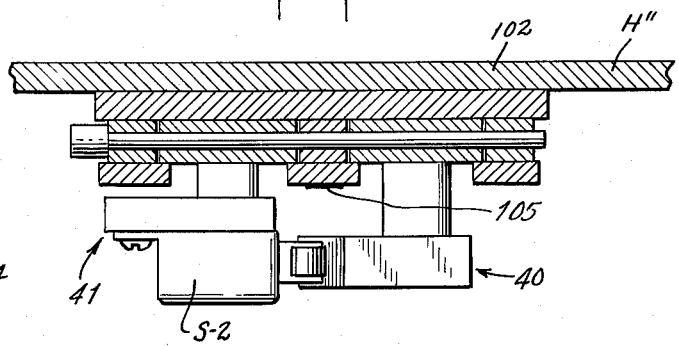
FIG. 8 is an enlarged fragmentary view taken along line 8—8 of FIG. 5.

FIGS. 5 through 8 illustrate a third form of the invention, including a housing H" which comprises a top wall 100, a bottom wall 101, a rear wall 102 and a front wall 103 having a transparent window 104 which carries a vertical scale having graduations 105, as shown in FIG. 5. Units 40 and 41 are arranged for vertical sliding movement instead of horizontal sliding movement, as in the case of the earlier-described forms of the invention. The bottom wall is provided with a first set of spaced grommets 106, 106' and 106" and a second set of spaced grommets 107, 107' and 107".

Secured to and depending from top wall 100 is a pair of parallel, inverted, U-shaped brackets 110 and 111. These brackets are provided with corresponding parallel pivot pins 112 and 113, respectively. A first lever 115 is pivotally connected to pin 112. A first link 116 is pivotally connected to lever 115 at 117 and to unit 41 at 118. An arm 120, having an arcuate outer surface 121, is affixed to lever 115 by screws 122. The lever has a series of openings 123 to permit varying the distance between arm 120 and pivot pin 112. A wire line, cable or the like, 124 is anchored to the upper end of arm 120, as indicated at 125, extends through grommet 106 and is adapted to be connected to strap 72. Wire line 124 is adapted to extend through grommet 106' or 106" depending on the position of arm 120 relative to pivot pin 112.

A spring 126, which is stressed in tension, is connected at one end to lever 115, as indicated 127, and at its other end to an eyebolt 128 which is connected to housing bottom wall 101 by bracket 129. Spring 126 serves the same function as earlier-described spring 57.

A second lever 130 is pivoted to pin 113. A second link 131 is pivotally connected at 132 to lever 130 and at 133 to unit 40. An arm 134, having an arcuate outer surface 135, is attached to lever 130 by screws 136. A second wire line, cable or the like 137 is anchored at 138 to arm 135, extends through grommet 107 and is adapted to be connected to strap 79. It will be observed that lever 130, link 131 and arm 134 correspond, respectively, to lever 115, link 116 and arm 120. Also lever 115 and 130 serve the same function as levers 88 and 94, earlier-described, while links 116 and 131 serve the functions of wire lines 83 and 92, respectively. A second spring 140 is connected at one end to lever 130, as indicated at 141, and at its other end to an eyebolt 142 which is secured to the housing bottom wall by a bracket 143. Spring 140 serves the same function as earlier described spring 50.

The operation of a form of the invention shown in FIGS. 5 through 8 is similar to the operation of the other described forms of the invention.

From the foregoing, it is believed that the construction, operation, objects and advantages of my present invention will be readily comprehended by persons skilled in the art, without further description. It is to be clearly understood, however, that various changes in the constructions described above and illustrated in the drawings may be made without departing from the scope of the invention, it being intended that all matter contained in the description or shown in the drawings shall be interpreted as illustrated only and not in a limiting sense.

I claim:

1. In apparatus for use with a load, such as piping, at least a portion of which is subjected to angular movement while in active service, a support, a first unit carried by and slidable relative to the support, first coupling means connected to the first unit and adapted to be connected to the load, a second unit carried by and slidable relative to the support independently of the first unit, and second coupling means connected to the second unit and adapted to be connected to the load at a point spaced from the connection of the first unit to the load, said coupling means adapted to impart differential sliding movement to the first and second units relative to the support in response to angular movement of the load in one direction, one of the units including electric switch means, the other unit including means for operating the switch means in response to predetermined differential sliding movement of the first and second units relative to the support.

2. In apparatus for use with a load, such as piping, at least a portion of which is subjected to angular movement while in active service, a support, a first unit carried by and slidable relative to the support, first coupling means connected to the first unit and adapted to be connected to the load, a second unit carried by and slidable relative to the support, second coupling means connected to the second unit and adapted to be connected to the load at a point spaced from the connection of the first unit to the load, and biasing means comprising a first spring connected to the first unit and to the support and a second spring connected to the second unit and to the support, said biasing means normally urging the first and second units in one direction relative to the support, said coupling means adapted to impart differential sliding movement to the first and second units relative to the support against the action of the biasing means in response to angular movement of the load in one direction, one of the units including electric switch means, the other unit including means for operating the switch means in response to predetermined differential sliding movement of the first and second units relative to the support.

3. In apparatus for use with a load, such as piping, at least a portion of which is subjected to angular movement while in active service, a support, a first unit carried by and slidable relative to the support, first coupling means connected to the first unit and adapted to be connected to the load, a second unit carried by and slidable relative to the support independently of the first unit, and second coupling means connected to the second unit and adapted to be connected to the load at a point spaced from the connection of the first unit to the load, said coupling means adapted to impart differential sliding movement to the first and second units relative to the support in response to angular movement of the load in one direction, one of the units including a pair of electric switches, the other unit including means for operating one of the switches in response to predetermined differential sliding movement of the first and second units in one direction relative to the support and for operating the other switch in response to predetermined differential sliding movement of the first and second units in a reverse direction relative to the support.

4. In apparatus for use with a load, such as piping, at least a portion of which is subjected to angular movement while in active service, a support, a first unit carried by and slidable relative to the support, first coupling means connected to the first unit and adapted to be connected to the load, a second unit carried by and slidable relative to the support independently of the first unit, second coupling means connected to the second unit and adapted to be connected to the load at a point spaced from the connection of the first unit to the load, biasing means normally and yieldingly urging the first and second units in one direction relative to the support, said coupling means adapted to impart differential sliding movement to the first and second units relative to the support against the action of the biasing means in response to angular movement of the load in one direction, one of the units including a pair of electric switches, the other unit including means for operating one of the switches in response to predetermined differential sliding movement of the first and second units in one direction relative to the support and for operating the other switch in response to predetermined differential sliding movement of the first and second units in a reverse direction relative to the support.

5. Apparatus according to claim 4 wherein the biasing means comprises a first spring connected to the first unit and to the support and a second spring connected to the second unit and to the support.

6. Apparatus according to claim 4 wherein at least one of the coupling means consists of a flexible connector.

7. Apparatus according to claim 4 wherein at least one of the coupling means consists of a lever pivotally connected to the support and first and second flexible connectors, the first flexible connector being connected at one end to one of the units and at its other end to the lever, the second flexible connector being connected at one end to the lever and being adapted to be connected at its other end to the load, the pivotal connection between the lever and the support being intermediate the connections between the lever and the flexible connectors.

8. Apparatus according to claim 4 wherein at least one of the coupling means consists of a lever pivotally connected to the support, a link pivotally connected at one end to the lever and at its other end to one of the units, and a flexible connector connected at one end to the lever and adapted to be connected at its other end to the load, the lever being pivotally connected to the support at a point intermediate its connections with the link and the flexible connector.

References Cited by the Examiner
UNITED STATES PATENTS

| | | | |
|---|---|---|---|
| 2,248,730 | 7/41 | Wood | 248—54 |
| 2,919,088 | 12/59 | Zollinger | 248—54 |
| 2,945,656 | 7/60 | Sherburne | 248—54 |
| 2,974,915 | 3/61 | Zollinger | 248—58 |
| 2,981,512 | 3/61 | Zollinger | 248—58 |
| 3,031,160 | 4/62 | Sherburne | 248—58 |

BERNARD A. GILHEANY, *Primary Examiner.*